3,037,060
RECOVERY OF TRIMETHYLOLALKANES
August W. Dege, Ridgewood, N.J., assignor to Heyden Newport Chemical Corporation, New York, N.Y., a corporation of Delaware
No Drawing. Filed July 2, 1958, Ser. No. 746,105
5 Claims. (Cl. 260—637)

This invention relates to a novel process for the recovery of trimethylolalkane from aqueous solutions and to the novel products resulting from this process.

Trimethylolethane, a trihydric alcohol which has been found useful in the preparation of synthetic drying oils, alkyd resins, and other resins, is generally prepared by the condensation of formaldehyde with propionaldehyde in the presence of an alkaline material, such as sodium hydroxide. In addition to trimethylolethane, this process yields a number of by-products of the reaction, including ditrimethylolethane, formals of trimethylolethane and ditrimethylolethane, and a formate salt. Separation of trimethylolethane from these by-products of the reaction has been accomplished only by performing elaborate and extensive purification steps.

A procedure for the recovery of a technical grade of trimethylolethane and other trimethylolalkanes from aqueous reaction liquors has been described in the copending application of R. T. Gottesman et al., Serial No. 690,186, which was filed on January 24, 1958. This procedure, which includes the steps of extracting aqueous reaction liquor with amyl alcohol, steam-distilling the amyl alcohol extract to form an aqueous solution of the polyhydric material, and contacting this solution with anion-exchange and cation-exchange material, yields an aqueous solution containing trimethylolalkane, its dimer, and formals of the trimethylolalkane and its dimer. The drying of this solution yields a mixture of polyhydric materials which contains at least 85% of the trimethylolalkane and no more than 0.1% of inorganic salts. This dried mixture of polyhydric materials, which is considered to be a technical grade of the trimethylolalkane, has been shown to be useful in the preparation of synthetic resins and oils that compare favorably in all respects with those prepared from the more costly pure trimethylolalkanes.

Considerable difficulty has been encountered in the drying of technical trimethylolethane and other trimethylolalkanes. While it is possible to evaporate the deionized aqueous solution to dryness on a small scale by first concentrating the solution in a single effect evaporator and then completing the drying in a rotary vacuum dryer, such a procedure has proven unsatisfactory for the large scale production of technical trimethylolalkane. The prolonged heating that the material undergoes during this evaporation procedure results in thermal degradation of the polyhydric material with discoloration of the product.

The following table indicates the deterioration that took place in one batch of technical trimethylolethane during prolonged heating.

| Time, Hrs. | Temp., °C | Pressure in. vac. | APHA Color | Hydroxyl Content |
|---|---|---|---|---|
| 0 | | 0 | 5 | 41.1 |
| 5 | 195 | 0 | 180 | |
| 5 | 195 | 26 | 28 | |
| 0.25 | 195 | 30 | | 40.89 |
| 1 | 195 | 30 | 14 | |
| 2 | 195 | 30 | 14 | |
| 3 | 195 | 30 | 27 | 39.5 |

In addition the low melting point of the product and the tacky state of the dried material cause, in such a drying procedure, considerable mechanical difficulties from which result a reduction in the recovery and the formation of a non-uniform, dusty product. Furthermore, material dried by this procedure even when brought to a very low moisture content tends to coalesce on storage to a caked form which does not flow freely and which is difficult to handle.

This invention relates to a procedure for the recovery of technical trimethylolethane and related polyhydric alcohols which overcomes the above-mentioned difficulties in previously used recovery procedures. This procedure which does not call for a large capital investment for evaporating equipment and which involves little operating labor in its operation makes possible the recovery of high quality trimethylolethane in nearly quantitative yields. The product obtained is free-flowing, uniform, and dust-free and does not coalesce on storage at ordinary temperatures and humidities.

In this procedure a deionized aqueous solution of technical trimethylolethane is subjected for a brief period of time to relatively high temperatures at subatmospheric pressure to cause the flash evaporation of substantially all of the water from the polyhydric material. Because of the short heating time, a product is obtained that possesses excellent color characteristics and that has not suffered thermal degradation.

This procedure can be carried out in any apparatus in which the polyhydric alcohol solution can be heated rapidly under reduced pressure to cause flash evaporation of the water to occur and from which the product can be quickly withdrawn. I have found that the flash evaporation of water from trimethylolethane solutions is conveniently carried out in an evaporator of the falling-film type. In a falling-film evaporator the solution is fed continuously into a heated, partially evacuated vessel in such a way that the walls of the vessel are coated with a uniform, thin film of the solution. This can be accomplished by careful control of the feed rate or by the presence in the vessel of rotor blades which spread the film evenly on the walls. As the solution flows down the heated walls of the vessel, water is flash-evaporated from it. The water vapor is removed from the evaporator through a vapor outlet; molten dehydrated technical trimethylolethane is discharged continuously from an outlet at the bottom of the evaporator.

The vapors removed from the evaporator may be condensed and collected. The resulting condensate which contains a small amount of polyhydric material can be recycled through the evaporator to increase the recovery of the product.

The molten technical trimethylolethane obtained by this procedure can be used directly in the production of synthetic resins and oils or it can be cooled by known techniques to form particles of any desired form. For example, it can be extruded to form pellets, formed into small balls by prilling, or flaked on chilled rolls. It has been found that such particles of technical trimethylolethane are free-flowing and do not coalesce on storage at ordinary temperatures and humidities.

In order to obtain the above-mentioned advantages of the present procedure, it is necessary that the removal of water from the deionized aqueous solution of technical trimethylolethane be accomplished quickly. In practice it has been found that if the solution is passed through a falling-film evaporator which is maintained at an absolute pressure of approximately 50 mm. to 400 mm. of mercury at a temperature between the vaporization temperature of water and the sublimation temperature of trimethylolethane at the pressure employed in a period of less than 2 minutes, the product contains no more than 0.4% of water and gives no evidence of having undergone thermal degradation. Preferably the trimethylolethane remains in the flash evaporation zone between approximately 15 and 40 seconds. When a shorter heating period is employed, the product contains more than the desired amount of water. A heating period of more than 2 minutes results in discoloration of the product.

The deionized aqueous solution used as feed in this recovery process initially contains 20 to 30% solids. This solution may be used as such in the present process. I prefer, however, to concentrate the solution to approximately 80 to 90% solids by evaporation in a vacuum still before introducing it into the falling-film evaporator. By so doing I minimize the time required at the elevated temperature for the removal of water and thereby reduce the danger of product discoloration.

To obtain the maximum dehydration of the trimethylolethane during the brief flash-evaporation period I may preheat the solution before feeding it into the evaporator. The solution is preheated to a temperature between 80° C. and 100° C., with the preferred range approximately 90–95° C. Heating the solution at this temperature for prolonged periods of time is avoided because such treatment tends to discolor the product. Preferably the solution is preheated shortly before it enters the evaporator.

The evaporator in which the process is carried out is operated under subatmospheric pressure, generally in the range of 50 mm. to 400 mm. of mercury (absolute) with approximately 100 mm. to 250 mm. of mercury preferred. At pressures of less than 50 mm. the product tends to sublime; at pressures above 400 mm. it contains excessive amounts of water. The temperature to which the evaporator is heated lies between the vaporization temperature of water and the sublimation temperature of trimethylolethane at the pressure employed. Within the preferred range of pressures, evaporator wall temperatures of approximately 200°–250° C. are preferred.

In addition to being useful in the recovery of trimethylolethane from aqueous solution, this process can also be used for the recovery of other trimethylolalkanes, such as trimethylolpropane and trimethylolbutane, from aqueous solutions.

The invention is illustrated by the examples that follow.

*Example 1*

The flash evaporator used in this example and in Example 2 was a falling-film type of evaporator. The feed solution was introduced continuously through an inlet located near the top of the heating chamber. Vapors were removed through an outlet at the top of the chamber; the molten dehydrated product was discharged continuously through an outlet at the bottom of the chamber. Blades attached to a shaft which extended vertically through the evaporator were rotated to cause the product to form a uniform thin film on the walls of the heating chamber.

An 85% aqueous solution of technical TME (3575 grams) was preheated to 91° C. and then fed over a period of 6 minutes into the above-described falling-film evaporator, the heating chamber of which was maintained at 233° C. and 118 mm. of mercury (absolute pressure). The product, which was discharged continuously approximately 20 seconds after the introduction of the feed, was a liquid at a temperature of 190° C. This product was readily flaked by passing it over chilled rolls to form a free-flowing product which contained 0.25% of water. This flaked material did not coalesce on storage at ordinary temperatures and humidities. The recovery of substantially anhydrous TME amounted to 94.1%.

*Example 2*

Over a period of 6 minutes there was fed into the falling-film evaporator described in Example 1, 2610 grams of an 85% aqueous solution of technical TME which had been preheated to 91° C. In this run the heating chamber was maintained at 213° C. and 214 mm. of mercury (absolute pressure). The product was discharged continuously at a temperature of 172° C. approximately 20 seconds after the feed was introduced and solidified rapidly on cooling. There was a quantitative recovery of the product, which contained 0.04% of water and which had an APHA (5/50) color of 3. The APHA color is based on a test procedure set forth by the American Public Health Association as reported in "Standard Methods for the Examination of Water and Sewage," 9th edition, 1946, pages 14 and 15.

I claim:

1. The process of recovering a trimethylolalkane selected from the group consisting of trimethylolethane, trimethylolpropane, and trimethylolbutane from aqueous solution comprising heating said solution at a subatmospheric pressure at a temperature between the vaporization temperature of water and the sublimation temperature of the trimethylolalkane at said subatmospheric pressure for a period of less than 2 minutes to obtain a vapor phase and a molten trimethylolalkane phase, separating said vapor phase from said molten trimethylolalkane phase, and thereafter recovering said molten trimethylolalkane phase.

2. The process of recovering trimethylolethane from aqueous solution comprising heating said aqueous solution at a subatmospheric pressure at a temperature between the vaporization temperature of water and the sublimation temperature of trimethylolethane at said subatmospheric pressure for a period of less than 2 minutes to obtain a vapor phase and a liquid trimethylolethane phase, separating said liquid vapor phase from said trimethylolethane phase, and thereafter recovering said liquid trimethylolethane phase.

3. The process of recovering trimethylolethane from aqueous solution comprising heating said solution at a subatmospheric pressure at a temperature between the vaporization temperature of water and the sublimation temperature of trimethylolethane at said subatmospheric pressure for a period of 15 to 40 seconds to obtain a vapor phase and a liquid trimethylolethane phase, separating said vapor phase from said liquid trimethylolethane phase, forming a film of trimethyolethane on the surface of a chilled roll, and thereafter removing the solid film from the roll surface in the form of flakes containing approximately 0.2 to 0.4% of water.

4. The process of recovering trimethylolethane from aqueous solution comprising heating said solution at approximately 200° to 250° C. at an absolute pressure between 50 mm. and 400 mm. of mercury for 15 to 40 seconds to obtain a vapor phase and a liquid trimethylolethane phase, separating the vapor phase from the liquid trimethylolethane phase, and thereafter recovering said liquid trimethylolethane phase.

5. The process of recovering trimethylolethane from a solution of trimethylolethane in water comprising the steps of concentrating said solution until it contains approximately 10% to 20% of water, heating the concentrated solution at 200° to 250° C. at an absolute pressure between 50 mm. and 400 mm. of mercury for 15 to 40 seconds to obtain a vapor phase and a liquid trimethylolethane phase, separating the vapor phase from the liquid trimethylolethane phase, and thereafter recovering said liquid trimethylolethane phase.

References Cited in the file of this patent

UNITED STATES PATENTS

| | | |
|---|---|---|
| 2,420,496 | Poitras et al. | May 13, 1947 |
| 2,533,737 | Mertz | Dec. 12, 1950 |
| 2,806,889 | Gottesman et al. | Sept. 17, 1957 |
| 2,806,890 | Gottesman | Sept. 17, 1957 |
| 2,806,891 | Gottesman et al. | Sept. 17, 1957 |
| 2,806,892 | De Lorenzo | Sept. 17, 1957 |

OTHER REFERENCES

Weissberger: Technique of Organic Chemistry (1951), vol. IV, p. 463.

Weissberger: Technique of Organic Chemistry (1956), vol. III, part I, pages 821, 822.